United States Patent Office 3,577,456
Patented May 4, 1971

3,577,456
PROCESS FOR THE MANUFACTURE OF AQUEOUS ALKALI PARAFFIN SULPHONATE SOLUTIONS CONTAINING SMALL AMOUNTS OF ALKALI SULFATE
Hans-Jerg Kleiner, Bad Soden, Taunus, and Karl Rehn, Hofheim, Taunus, Germany, assignors to Farbwerke Hoechst Aktiengesellschaft vormals Meister Lucius & Bruning, Frankfurt am Main, Germany
No Drawing. Filed Feb. 16, 1968, Ser. No. 705,904
Int. Cl. C07c *143/02, 139/14;* B01f *17/02*
U.S. Cl. 260—513       6 Claims

ABSTRACT OF THE DISCLOSURE

An aqueous solution of alkali paraffin sulphonates having a low content of alkali sulphate is obtained from sulphoxidation products by separating the main part of the hydrotropically dissolved paraffin by addition of a low molecular alcohol, neutralizing the aqueous-alcoholic solution with an alkali and separating the precipitated alkali sulphate.

---

The solutions of paraffin sulphonic acids, obtained by sulphoxidation of n-paraffins, for example, according to German Pat. No. 910,165, contain besides sulphur dioxide sulphuric acid and hydrotropically dissolved paraffins. In order to prepare technically useful paraffin sulphonates from these solutions it is necessary to eliminate the sulphur dioxide, at least 80% to 85% of the sulphuric acid and the greatest possible amount of paraffins.

Several attempts have already been made to solve this problem. According to the process of German Pats. Nos. 907,052 and 910,165, the solutions of the paraffin sulphonic acids, for example, those which are separated from the main part of paraffin by the addition of low molecular alcohols, are extracted with branched hydrocarbons in order to eliminate the remaining parts of the dissolved paraffins, and sulphur dioxide, and the organic solvents are eliminated from the extracted solutions by distillation up to a sump temperature of about 120° C. After this operation a sulphuric acid having a concentration of 40% can be separated, and only a dark coloured concentrated solution of the paraffin sulphonic acid is obtained. According to German Pat. No. 910,165 it is also possible to free the original extract from sulphur dioxide by heating it up to about 100° C. By this procedure about 40% of the total amount of sulphuric acid separated out as lower layer which can be removed. After neutralization of the paraffin sulphonic acid layer the paraffin content is separated from this layer at about 200° C. by means of steam, Also with this procedure only a dark coloured paraffin sulphonate is obtained containing, in addition, more than 20% of sodium sulphate. According to these proposals it is not possible to achieve an extensive separation of the sulphuric acid from the extracts together with a practically complete elimination of the hydrotropically dissolved paraffins under conditions which avoid a discoloration of the sulphonates.

The present invention provides a process for the manufacture of an aqueous solution of a sodium or potassium paraffin sulphonate having a low content of alkali sulphate, wherein the main part of hydrotropically dissolved paraffin in the aqueous extract obtained by the sulphoxidation of n-paraffin having a chain length of up to 18 carbon atoms is separated by addition of a low molecular alcohol containing 1 to 4 carbon atoms, especially methanol or ethanol, the aqueous alcoholic solution of paraffin sulphonic acid obtained thereby is neutralized with a sodium or potassium compound having an alkaline reaction and the pricipitated alkali sulphate is separated from the solution. The precipitated alkali sulphate may be separated from the solution of the alkali paraffin sulphonate, for example, by suction aided filtration or by centrifuging. The paraffin sulphonate solution, which at most contains only a small amount of dissolved alkali sulphate may then be freed from the remaining dissolved paraffin by extraction with a low-boiling aliphatic hydrocarbon. When the extracted paraffin sulphonate solution is concentrated by evaporation, a concentrated alkali paraffin sulphonate paste of light shade is obtained.

Furthermore, it is possible to separate the main part of the hydrotropically dissolved paraffin as described above and to extract the rest of the paraffin, at least to a large extent, according to German Pat. No. 907,052. The extracting agent is then distilled off and the remaining solution is neutralized and the alkali sulphate separated according to the invention as described above. The alkali sulphate thus obtained is very pure and is capable of being used for the most applications without any further purification.

As starting material for the process of the present invention there may be used, for example, an extract of a sulphoxidation procedure, described in German Pats. Nos. 735,096, 840,093 or 903,815 or an extract obtained by sulphoxidation carried out by means of a peroxide, ozone, gamma rays, for example, according to German Pat. No. 1,139,116. Such extracts show very often a high content of paraffin disulphonic acid, which is, however, in the process of the present invention of no detriment. It is, however, preferred to use in the process of the present invention an aqueous extract which is obtained when sulphoxidation of n-paraffins with chain length of about 7 to about 18, preferably 10 to 18 carbon atoms.

The low-molecular alcohols having 1 to 4 carbon atoms especially methanol or ethanol which are used for the separation of the paraffin, may contain up to about 20% by weight of water. The amount of alcohol generally required is about 50 parts to 500 parts by weight, referred to 100 parts by weight of paraffin sulphonic acid. When starting with relatively short-chained paraffin sulphonic acid with up to about 13 carbon atoms in the chain, the proportion alcohol/water which has formed is practically without importance, since the alkali salts of these paraffin sulphonic acids are easily soluble in alcohols as well as in water. However, when long-chained paraffin sulphonic acids are used it is however suitable to choose such a proportion of alcohol to water so that the alkali sulphonate formed by the neutralization remains dissolved.

For neutralization of the paraffin sulphonic acid there may be used any sodium or potassium compound having an alkaline reaction, hereinafter referred to as "alkali," for example, sodium or potassium hydroxide, suitably in form of a concentrated aqueous solution, but also sodium or potassium carbonate or sodium or potassium bicarbonate. The alkali may be added to the extract with brisk stirring at such a rate that the temperature rises to over about 35°, due to the released neutralization heat. When using a sodium compound as the alkali for the production of sodium paraffin sulphonate paste it is suitable to maintain a temperature of above 35° C. in order to avoid a possible precipitate of the sodium sulphate as Glauber's salt.

After the neutralization is terminated and after stirring for a short time the greatest part of the sulphuric acid precipitates surprisingly after a few minutes in form of a crystalline alkali sulphate. The alkali sulphate precipitate is easily to filter by suction or by centrifuging. If no prior extraction of paraffin has been made, the alkali sulphate is generally impure because of adhering paraffin sulphonate and perhaps paraffin.

According to hitherto proposed processes the main part of the sulphuric acid is separated from the extract, for example, according to the processes of the German Pats. Nos. 907,052 or 910,165 before neutralization by heating or evaporating. Discoloration of the paraffin sulphonate solutions generally resulted. With the process of the present invention the main part of the sulphuric acid is precipitated in the form of alkali sulphate at the neutralization stage at a low temperature without the result of any discoloration. When separating the alkali sulfate, a practically colourless solution of the alkali paraffin sulphonate is obtained.

Furthermore, if the paraffin has not been extracted before the neutralization the paraffin sulphonate solutions may also subsequently be extracted in order to eliminate any remainder of dissolved paraffin. As extraction agents there may be used a saturated aliphatic hydrocarbon having a boiling point of up to 120° C., preferably up to 80° C., for example, an alkane having a chain length of about 5 to 8 carbon atoms, for example, n-pentane, n-hexane or 2,3-dimethyl pentane. But it is also possible to use mixtures of more than one hydrocarbon having different chain lengths. The hydrotropic solubility of these hydrocarbons in paraffin sulphonate solutions depends on the content of the solutions of alcohol and water; the higher this content, the less the hydrotropic solubility of the extraction agents. It is surprising, that the solubility of these hydrocarbons, used as extraction agents in the neutralized paraffin sulphonate solutions of the present invention, is generally about 50% less than in the corresponding not neutralized paraffin sulphonic acid solutions of the same concentration. Thus, paraffin sulphonic acid solutions, which have about equal parts of alcohol, water and paraffin sulphonic acid, dissolve about 20% to 25% by weight of these extraction agents, whereas only about 8% to 12% by weight of the extraction agents are dissolved in the solutions of the present invention after the neutralization step and after the separation of the alkali sulphate. Moreover, the hydrocarbons used as extraction agents do not dissolve traces of the alkali paraffin sulphonate during the extraction. Therefore when the extraction agents containing the remaining paraffins are distilled, for example, for the recovery of these remaining paraffins, a discoloration of these remaining paraffins is avoided. On the other hand, the residual paraffins, obtained, for example, according to German Pat. No. 907,052 by extraction of the not neutralized paraffin sulphonic acid solutions, undergo a considerable discoloration due to the decomposition of parts of the paraffin sulphonic acid which were dissolved simultaneously (cf. F. Asinger, "Chemie und Technologie der Paraffinkohlenwasserstoffe," Berlin (1956), page 545).

The paraffin sulphonate solutions, obtained in the process of the present invention, may finally be freed from the low-molecular alcohol, preferably methanol and ethanol, and from the aliphatic hydrocarbons used as extraction agents by distillation. Thus the paraffin sulphonates are present as concentrated solutions or pastes having a low content of alkali sulphate. Because of their mild working-up conditions they are of bright shade, practically odourless and normally need no bleaching. In general, they contain about 1% to 10% by weight of alkali sulphate, referred to 100% dry product.

In working up paraffin sulphoxidation extracts the process of the present invention presents a considerable technical progress. The new working method enables to produce bright-practically odourless solutions of tensides containing little alkali sulphate, which, when incorporated into detergents, leave enough latitude for admixing the inorganic skeleton substances. Alkali paraffin sulphonate pastes, containing an amount of alkali sulphate as small as possible, are valuable emulsifiers.

In the following examples which illustrate the invention, the percentages are by weight.

EXAMPLE 1

An extract, prepared by sulphoxidation of a mixture of n-paraffins containing 13 to 18 carbon atoms in the presence of water and UV-light, was separated from the main part of the paraffins by the addition of methanol. 1 kg. of the methanolic solution thus obtained, which contained 22% of paraffin sulphonic acids, 7.2% of sulphuric acid, 3.2% of n-paraffins, 30.8% of water and 36.8% of methanol, was neutralized with brisk stirring at 45° C. by the addition of 174 grams of a 45% sodium hydroxide solution over a period of 30 minutes. After stirring for further 15 minutes 85 g. of sodium sulphate were filtered with suction. The sodium sulphate contained 6% of n-paraffins and 3.8% of paraffin sulphonate. After an extraction with n-hexane (3 times each with 300 g.) the solutions were thickened. 500 grams of a light paste were obtained, containing 46.6% of sodium paraffin sulphonate and 5.0% of sodium sulphate.

If after the separation of the main part of the paraffin the remainder thereof is extracted with n-hexane with subsequent distilling off of the hexane, the methanolic solution contains less than 0.1% of n-paraffin. The sodium sulphate filtered off with suction is free of paraffin.

EXAMPLE 2

1 kg. of a paraffin sulphonate solution, prepared according to Example 1 and having the same composition except that the methanol was replaced by ethanol, was neutralized at 35° C. to 40° C. by the addition of 113 grams of soda powder over 30 minutes. After stirring for 15 minutes 83 grams of sodium sulphate were filtered with suction, the sodium sulphate containing 1.7% of n-paraffins and 3.8% of paraffin sulphonates. The solution was extracted with n-pentane and concentrated. 500 g. of a light paste were obtained, containing 46.8% of sodium paraffin sulphonate and 5.0% of sodium sulphate. When proceeding in the same manner, but using potash instead of soda, a paste containing 50% of potassium paraffin sulphonate was obtained.

EXAMPLE 3

1 kg. of a paraffin sulphonate solution, obtained according to Example 1, and containing 21.8% of paraffin sulphonic acids, 1.2% of n-paraffins, 7.1% of sulphuric acid, 28.4% of water and 41.5% of methanol, was neutralized at 40° C. to 50° C. by the addition of 173 g. of a 45% sodium hydroxide solution over 30 minutes. After the stirring was terminated, 100 grams of sodium sulphate were centrifuged, containing hardly any n-paraffins and 3.0% of paraffin sulphonates. After extraction with n-hexane the solutions were thickened. 520 grams of a light paste were obtained, containing 45.2% of sodium paraffin sulphonate and 1.2% of sodium sulphate.

EXAMPLE 4

An extract, prepared by sulphoxidation of a mixture of n-paraffins containing 10 to 13 carbon atoms in the presence of water and UV-light, was separated from the main part of the paraffins by means of methanol. 1 kg. of the methanolic solution thus obtained, consisting of 21.5% of paraffin sulphonic acids, 6% of n-paraffins, 8.1% of sulphuric acid, 26.7% of water and 37.7% of methanol, was neutralized at 40° C. by the addition of 220 grams of a 45% sodium hydroxide solution over 30 minutes. Afterwards, 110 grams of sodium sulphate were filtered with suction. The sodium sulphate contained 3.8% of n-paraffins and 0.8% of paraffin sulphonates. After extraction with n-pentane 456 grams of a light paste were obtained, containing 51.6% of sodium paraffin sulphonate and 2.8% of sodium sulphate.

EXAMPLE 5

An extract, obtained by sulphoxidation of a mixture of n-paraffins containing 13 to 18 carbon atoms with alpha rays, was separated from the main part of the paraffins by addition of methanol. 1 kg. of the thus obtained methanolic solution, consisting of 40.3% of paraffin sulphonic acids, of which about 40% were paraffin disulphonic acids, and 3.7% of sulphuric acid, 4.2% of n-paraffins, 28.3% of water and 23.5% of methanol, was neutralized at 50° C. by the addition of 210 grams of a 45% sodium hydroxide solution over 30 minutes with brisk stirring. After stirring for a further 15 minutes, 48 g. of sodium sulphate were filtered with suction, the sodium sulphate containing 1.5% of n-paraffins and 7.5% of paraffin sulphonate. After extraction with n-hexane the solutions were thickened. A light paste was obtained, containing 63.1% of sodium paraffin sulphonate and 2.0% of sodium sulphate.

EXAMPLE 6

The main part of the heptane was separated by the addition of methanol from an extract, obtained by sulphoxidation of n-heptane in the presence of water and UV-light. 1 kilogram of the solution thus obtained, containing 27.0% of heptane sulphonic acids, 7.8% of sulphuric acid, 3% of n-heptane, 16.1% of water and 46.1% of methanol, was neutralized at 35° C. by the addition of 251 grams of a 45% sodium hydroxide solution over 30 minutes. After stirring for 15 minutes, 106 grams of sodium sulphate, containing 3.8% of heptane sulphonate were filtered with suction. The solvents were distilled off together with the n-heptane and 400 grams of a product were obtained, containing 74.5% of sodium heptane sulphonate and 2.8% of sodium sulphate.

We claim::
1. In a process for the manufacture of an aqueous solution of a sodium or potassium paraffin sulfonate, containing small amounts of alkali sulfate, which sulfonate is obtained by sulfoxidation of one or more n-paraffins of 7 to 18 carbon atoms and wherefrom the main portion of the hydrotropically dissolved paraffin has been separated from the extract by addition of a low molecular weight alcohol containing 1 to 4 carbon atoms which alcohol forms with sulfonic acid an aqueous-alcoholic solution, the improvement which comprises neutralizing the aqueous-alcoholic solution with a sodium or potassium compound having an alkaline reaction, separating the precipitated alkali sulfate; and recovering the sodium or potassium sulfonate.

2. The process as claimed in claim 1, wherein substantially the remainder of the paraffin from the aqueous-alcoholic sulfonate solution is extracted with an aliphatic hydrocarbon boiling up to 120° C.

3. The process as claimed in claim 1, wherein the sodium or potassium compound having alkaline reaction is sodium or potassium hydroxide, sodium or potassium carbonate or sodium or potassium bicarbonate.

4. The process as claimed in claim 1, wherein the low molecular weight alcohol containing 1 to 4 carbon atoms is methanol or ethanol.

5. The process as claimed in claim 1, wherein the paraffin has 10 to 18 carbon atoms.

6. A process for the preparation of sodium or potassium paraffin sulfonate obtained from sulfoxication of an n-paraffin of 7 to 18 carbon atoms or mixtures of said n-paraffins comprising the steps:

separating the unreacted paraffin from a reaction mixture containing sulfonic acid derivatives of said n-paraffin by addition to said reaction mixture an alcohol from 1 to 4 carbon atoms whereby said paraffin forms one phase and said sulfonic acid in an aqueous alcoholic solution forms another phase and said phases are separated;

adding to said aqueous alcoholic solution to form said sulfonate a sodium or potassium compound selected from the group consisting of sodium hydroxide, potassium hydroxide, sodium carbonate, potassium carbonate, sodium bicarbonate, and potassium bicarbonate;

separating by filtration a sulfate precipitate formed from said addition of said sodium or potassium compound to said aqueous alcoholic solution; and separating from the aqueous alcoholic solution of said sulfonate by extracting substantially all of the unreacted n-paraffin by addition to said solution of an aliphatic hydrocarbon boiling up to 120° C.; and recovering the sulfonate by distilling from said sulfonate residual amounts of said aliphatic hydrocarbon and said alcohol.

References Cited

UNITED STATES PATENTS

| 1,993,375 | 3/1935 | Luther et al. | 260—459 |
| 1,993,415 | 3/1935 | Rummerlsburg et al. | 252—353X |
| 2,178,786 | 11/1939 | Fasce et al. | 260—459 |

FOREIGN PATENTS

| 710,827 | 6/1965 | Canada | 260—513 |

RICHARD D. LOVERING, Primary Examiner

U.S. Cl. X.R.
252—353; 260—504